United States Patent
Richardson et al.

(10) Patent No.: US 8,144,690 B2
(45) Date of Patent: Mar. 27, 2012

(54) ATM MULTICASTING FOR DELIVERING INFORMATION OVER A NETWORK

(75) Inventors: John William Richardson, Hamilton, NJ (US); Kumar Ramaswamy, Princeton, NJ (US)

(73) Assignee: Thomson Licensing S.A. (FR)

( * ) Notice: Subject to any disclaimer, the term of this patent is extended or adjusted under 35 U.S.C. 154(b) by 1165 days.

(21) Appl. No.: 10/297,546

(22) PCT Filed: Jun. 8, 2001

(86) PCT No.: PCT/US01/18755
§ 371 (c)(1),
(2), (4) Date: Dec. 6, 2002

(87) PCT Pub. No.: WO01/95569
PCT Pub. Date: Dec. 13, 2001

(65) Prior Publication Data
US 2004/0125818 A1    Jul. 1, 2004

(51) Int. Cl.
*H04L 12/66* (2006.01)

(52) U.S. Cl. ........ 370/352; 370/390; 370/398; 370/420; 370/422; 370/432; 709/244; 709/245; 725/148

(58) Field of Classification Search .................. 370/390, 370/389, 351, 395.1, 397–399, 392, 395.31, 370/312, 329, 352–359, 395.52, 395.53, 370/401, 408, 409, 420, 422, 432, 466, 493–495; 725/86, 87, 91, 103, 62, 63, 67, 68, 144, 725/147–149; 709/245, 246, 244, 228, 229, 709/252
See application file for complete search history.

(56) References Cited

U.S. PATENT DOCUMENTS
5,742,772 A * 4/1998 Sreenan .................. 370/401
(Continued)

FOREIGN PATENT DOCUMENTS

| | | |
|---|---|---|
| JP | 09064873 | 3/1997 |
| JP | 10336176 | 12/1998 |
| JP | 11266250 | 9/1999 |
| JP | 2000004240 | 1/2000 |
| JP | 2000253053 | 9/2000 |
| JP | 2001177566 | 6/2001 |
| WO | 99/30242 | 6/1999 |
| WO | 99/31871 | 6/1999 |

(Continued)

OTHER PUBLICATIONS

Motorola, Inc., DSLAM: Digital Subscriber Line Access Multiplexer, Jul. 25, 1998, p. 3.*

*Primary Examiner* — Jeffrey M Rutkowski
(74) *Attorney, Agent, or Firm* — Tutunjian & Bitetto, P.C.

(57) ABSTRACT

A method that provides for multicast delivery of information in a DSL network includes creating transmission paths between a single source port and multiple destination ports in a DSL network; receiving information at the source port; determining which of the destination ports is to receive the information; and distributing the information from the source port to selective ones of the destination ports based on the prior referencing step. A DSL system for providing multicast delivery of information includes an ATM network layer for sending information, a digital subscriber line access multiplexer (DSLAM) coupled to the ATM network layer for receiving the information, and a network control system for controlling selective multiplexing of the information through the digital subscriber line access multiplexer (DSLAM).

18 Claims, 3 Drawing Sheets

U.S. PATENT DOCUMENTS

| | | | |
|---|---|---|---|
| 5,917,819 A * | 6/1999 | Yang et al. | 370/390 |
| 5,930,259 A * | 7/1999 | Katsube et al. | 370/409 |
| 6,009,099 A * | 12/1999 | Lewis et al. | 370/397 |
| 6,028,867 A | 2/2000 | Rawson et al. | 370/463 |
| 6,097,720 A * | 8/2000 | Araujo et al. | 370/355 |
| 6,301,255 B1 * | 10/2001 | Park | 370/399 |
| 6,320,864 B1 * | 11/2001 | Hebb et al. | 370/412 |
| 6,452,942 B1 * | 9/2002 | Lemieux | 370/408 |
| 6,597,689 B1 * | 7/2003 | Chiu et al. | 370/354 |
| 6,751,218 B1 * | 6/2004 | Hagirahim et al. | 370/390 |
| 6,931,005 B1 * | 8/2005 | Wilhelm | 370/390 |
| 7,054,313 B1 * | 5/2006 | Gerszberg et al. | 370/390 |
| 7,164,683 B1 * | 1/2007 | Wright et al. | 370/397 |
| 2002/0001310 A1 * | 1/2002 | Mai et al. | 370/390 |
| 2002/0196802 A1 * | 12/2002 | Sakov et al. | 370/389 |
| 2003/0081610 A1 * | 5/2003 | Bharucha et al. | 370/395.1 |
| 2003/0086429 A1 | 5/2003 | Yamanaka | |

FOREIGN PATENT DOCUMENTS

| | | |
|---|---|---|
| WO | WO 9941937 A1 * | 8/1999 |
| WO | WO0051297 | 8/2000 |
| WO | WO0191389 | 11/2001 |

* cited by examiner

ATM MULTICASTING FOR DELIVERING INFORMATION OVER A NETWORK

FIELD OF THE INVENTION

The present invention generally relates to network communications and, more particularly, to a method of ATM multicast distribution at an ATM network layer.

BACKGROUND OF THE INVENTION

Changing communications demands are transforming the existing public information network from one limited to voice, text and low resolution graphics to bringing multimedia, including full motion video, to everyone's home. A key communications transmission technology that is enabling transformation of existing public information networks to accommodate higher bandwidth needs is Asymmetric Digital Subscriber Line (ADSL), a modem technology. ADSL converts existing twisted-pair telephone lines into access paths for multimedia and high-speed data communications. ADSL can transmit up to 8 Mbps (Megabits per second) to a subscriber, and as much as 960 kbps (kilobits per second) or more in both directions. Such rates expand existing access capacity by a factor of 50 or more without new cable installations.

Asymmetric Digital Subscriber Line ADSL technology involves modems attached across twisted pair copper wiring in which transmission rates can be up to 8 Mbps downstream (to the subscriber) and from 16 kbps to 960 kbps upstream (from the subscriber), depending on line distance, can be achieved. Asynchronous Transfer Mode ATM is an ultra high-speed cell based data transmission protocol that may be run over ADSL. A Digital Subscriber Line Access Multiplexer (DSLAM) is a device that takes a number of ADSL subscriber lines and concentrates them to a single ATM line. Plain old telephone service POTS refers to basic analog telephone service. POTS takes the lowest 4 kHz bandwidth on twisted pair wiring. Any server sharing a line with POTS must either use frequencies above POTS or convert POTS to digital and interleave with other data signals.

Audio, video and other information is increasingly being distributed over networks from a single source to multiple destination points on the network. Networks have finite bandwidth capacities associated with them. Sending multiple copies of the same information to multiple destinations can become demanding on the network and does not constitute an efficient use of resources.

Accordingly, there is a need for implementing a multicast delivery service in a DSL network to make efficient use of the network.

SUMMARY OF THE INVENTION

A method that provides for multicast delivery of information in a DSL network includes creating transmission paths between a single source port and multiple destination ports in a DSL network; receiving information at the source port; determining which of the destination ports is to receive the information; and distributing the information from the source port to selective ones of the destination ports based on the prior referencing step.

A DSL system for providing multicast delivery of information includes an ATM network layer for sending information; a digital subscriber line access multiplexer (DSLAM) coupled to the ATM network layer for receiving the information; and a network control system for controlling selective multiplexing of the information through the digital subscriber line access multiplexer (DSLAM).

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention is a method of ATM multicasting at the ATM network layer in a DSLAM at the head-end network for the purpose of distributing information, such as real-time data, video or audio, to the customer premise equipment CPE. The ATM layer multicast delivery service enables a source to transmit ATM cells from a single point to multiple destinations (point-to-multipoint), rather than using traditional broadcast or uni-cast distribution methods. This can be viewed as an ATM virtual path/virtual circuit with a single source and multiple destinations. The ATM network layer will deliver the ATM cells (on a multicast basis) to the destination points specified in the ATM virtual path/virtual circuit connection profile. By implementing a multicast delivery service in a DSLAM at the head-end of a DSL network it is possible to make efficient use of network resources for the purpose of distributing audio, video and other information to the customer premise.

Figure 1:
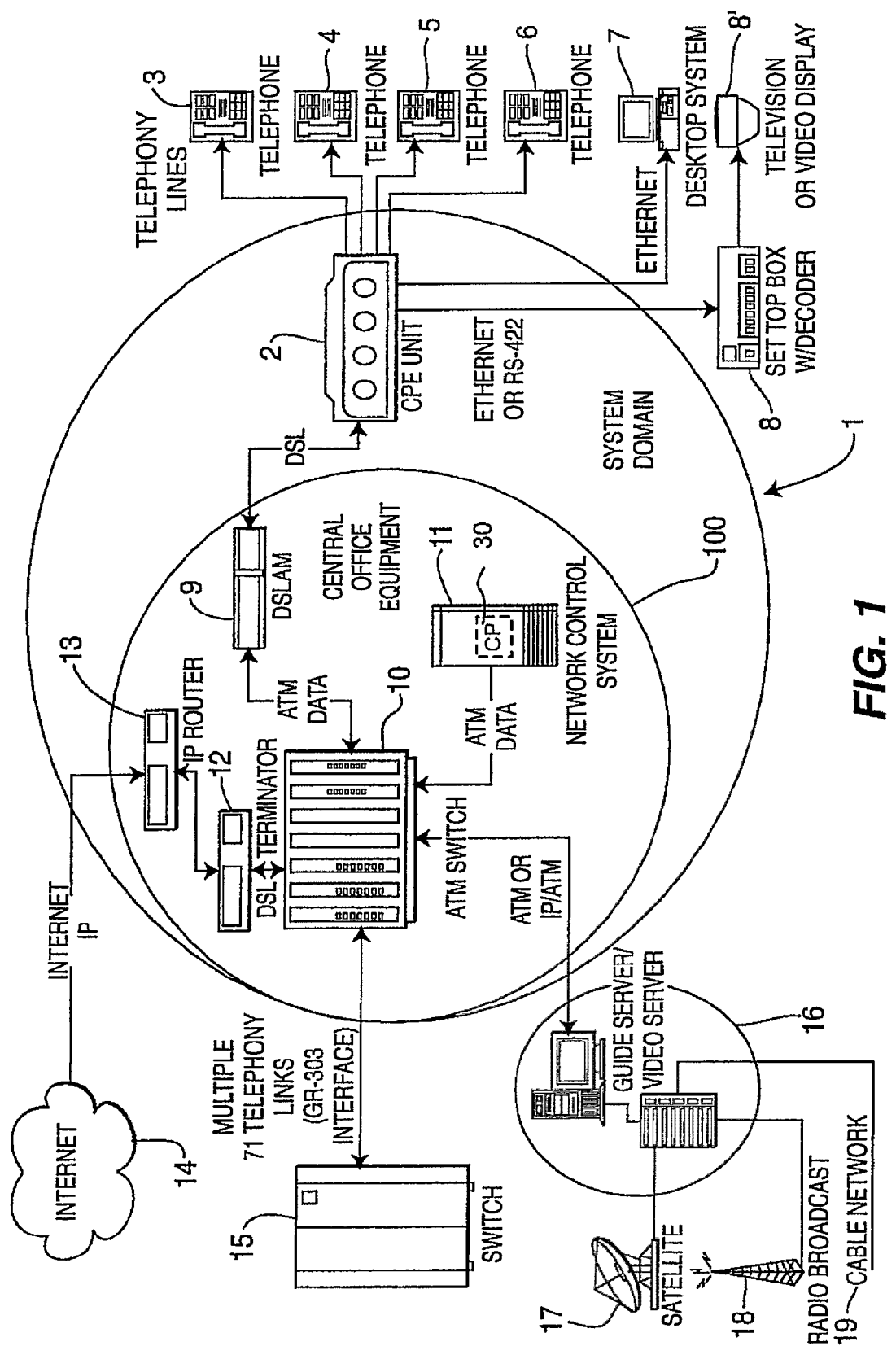
FIG. 1 is an exemplary digital subscriber line (DSL) system architecture capable of offering integrated multi-line telephony services such as voice, data and video.

A DSL system architecture 1 for integrating voice, data and video services, shown in FIG. 1, is presented as an exemplary DSL environment for employing the inventive method of enabling video phone communication and similar multimedia communication over a DSL link. Details of the individual block components making up the system architecture are known to skilled artisans, and will only be described in details sufficient for an understanding of the invention. The system block diagram 1 is composed of several functional blocks. The system domain is composed of Central Office (CO) Equipment 100 and Customer Premise Equipment (CPE). The component blocks within the system domain and their respective interfaces are: customer premise equipment (CPE), Digital Subscriber Line Access Multiplexer (DSLAM) 9, an ATM switch 2, an IP router 13 and DSL terminator 12, and a network control system (NCS) 11.

The current customer premise equipment (CPE) 2 includes a DSL modem unit that interfaces with four separate analog telephones 3-6 over a plain old telephone service (POTS), a 10 Base-T Ethernet connection to a PC desktop system 7, and an Ethernet or RS-422 connection to a set-top box with a decoder 8 for connection to a television or video display 8'. From the customer's analog end, the CPE device 2 accepts the analog input from each of the telephones 3-6, converts the analog input to digital data, and packages the data into ATM packets (POTS over ATM), with each connection having a unique virtual channel identifier/virtual path identifier (VCI/VPI). Known to skilled artisans, ATM is a connection oriented protocol and as such there is a connection identifier in every cell header which explicitly associates a cell with a given virtual channel on a physical link. The connection identifier consists of two sub-fields, the virtual channel identifier (VCI) and the virtual path identifier (VPI). Together these identifiers are used at multiplexing, de-multiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

The Ethernet data is also encapsulated into ATM cells with a unique VPI/VCI. The ATM cell stream is sent to the DSL modem to be modulated and delivered to the DSLAM unit 9.

Going in the other direction, the DSL signal is received and demodulated by the DSL modem in the customer premise equipment 2 and delivered to VPI/VCI detection processing. The ATM cell data with VPI/VCI matching that of the end user's telephone is then extracted and converted to analog POTS to be delivered to the telephone. The ATM cell data with VPI/VCI matching that of the end user's Ethernet is extracted and delivered to an Ethernet transceiver for delivery to the port.

The Digital Subscriber Line Access Multiplexer DSLAM 9 demodulates data from multiple DSL modems and concentrates the data onto the ATM backbone network for connection to the rest of the network. That DSLAM provides backhaul services for package, cell, and/or circuit based applications through concentration of the DSL lines onto ATM outputs to the ATM switch 10.

The ATM switch 10 is the backbone of the ATM network. The ATM switch 10 performs various functions in the network, including cell transport, multiplexing and concentration, traffic control and ATM-layer management. Of particular interest in the system domain 100, the ATM switch provides for the cell routing and buffering in connection to the DSLAM, network control system 11 and the Internet gateway (Internet Protocol IP router 13 and DSL terminator 12), and T1 circuit emulation support in connection with the multiple telephony links switch 15. A T1 circuit provides 24 voice channels packed into a 193 bit frame transmitted at 8000 frames per second. The total bit rate is 1.544 Mbps. The unframed version, or payload, consists of 192 bit frames for a total rate of 1.536 Mbps.

The ATM switch 10 is shown coupled to a program guide server/video server 16 to satellite 17, radio broadcast 18 or cable 19 networks. The ATM switch 10 is also coupled over the DSL terminator 12 and IP router 13 pair to receive Internet Protocol IP packet data from the Internet 14.

The network control system 100 provides for address translation, demand assignment and call management functions. The Network Control System's principle function is to manage the DSL/ATM network including the origination and termination of phone calls. The NCS is essentially the control entity communicating and translating control information between the class 5 PSTN switch (using the GR-303 protocol) and the CPE. The network control system 100 is available for other functions such as downloadable code to the CPE, and bandwidth and call management (e.g., busy) functions, as well as other service provisioning and set up tasks.

Figure 2:
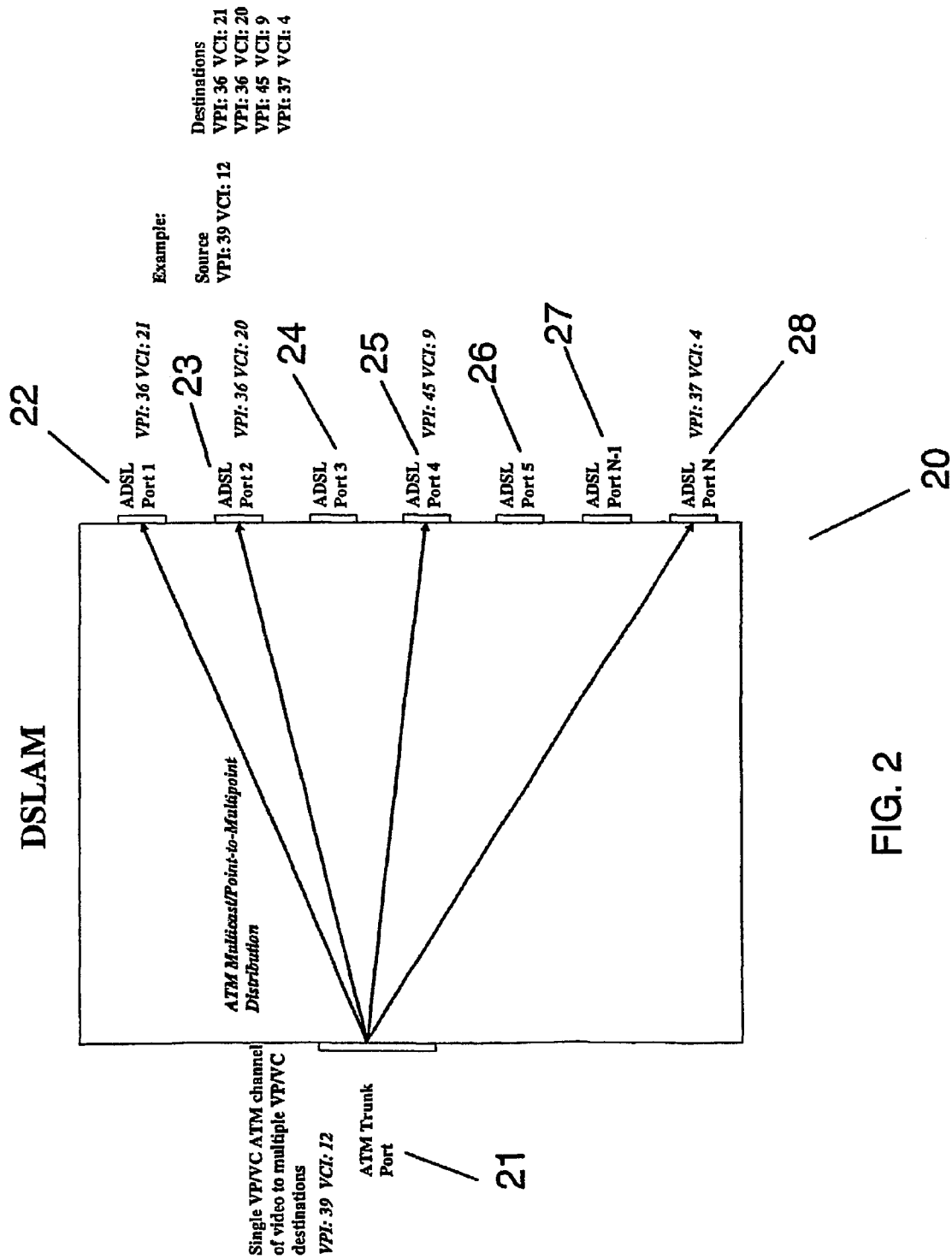
FIG. 2 is a block diagram of the inventive method of multicast delivery of information in a DSLAM at the head-end of a DSL network.

Turning now to FIG. 2, the block diagram 20 illustrates ATM multicasting at the ATM layer at the head-end of the network for the purposes of distributing audio, video and other information to the customer premises equipment CPE. Multicasting is an efficient method of data delivery that simultaneously sends information to a group of interested destination points. Networks have finite bandwidth capacities. Sending multiple copies of the same information to multiple destinations can become demanding on the network and does not constitute an efficient use of resources.

The DSLAM of FIG. 2 is configured with an ATM trunk port 21 and multiple destination ports 22-28. The ATM trunk port 21 is a single virtual path/virtual channel, illustratively assigned a VPI of 39 and a VCI of 12. In this exemplary ATM multicast/point-to-multipoint distribution information is delivered from the ATM trunk port 21 to multipoint destinations: ADSL port 1 22, ADSL port 2 23, ADSL port 4 25 and ADSL port N 28. ADSL port 1 22 is assigned a VPI of 36 and VCI of 21. ADSL port 2 23 is assigned a VPI of 36 and VCI of 20. ADSL port 4 25 is assigned a VPI of 45 and VCI of 9. ADSL port N is assigned a VPI of 37 and a VCI of 4.

ATM multicasting can be done at the ATM network layer. The ATM network layer is responsible for cell header generation and extraction, cell VPI/VCI translation and cell multiplexing and de-multiplexing. When a cell arrives at the trunk port it is identified as a channel of video or other information. This is based upon the arrived cell's VPI/VCI pair indicated in the cell header, which is a relationship known by the network control system. A connection profile 30 can be referenced to find the subscribers to this particular ATM virtual circuit. Based upon the connection profile, ATM cells can be duplicated to the group of customers subscribing to this channel.

Figure 3:
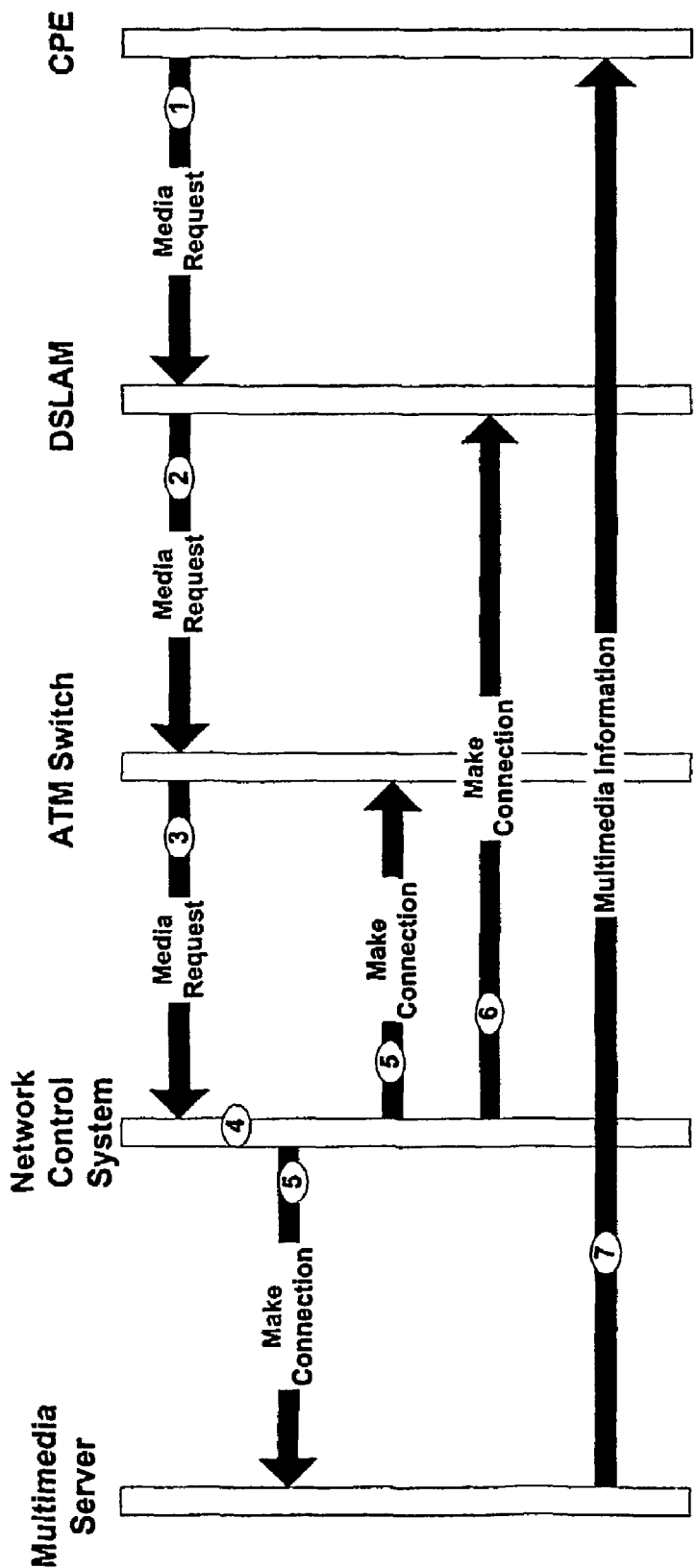
FIG. 3 is an example of a multimedia setup request to network to join a point-to-multipoint ATM virtual circuit.

FIG. 3 shows an example of a multimedia setup request to network to join a point-to multipoint ATM virtual circuit.

The Customer Premise Equipment (CPE) sends a request to the network for a multimedia program on an ATM signaling virtual circuit (1, FIG. 3). The message is sent to the ATM switch based on the ATM signaling virtual circuit (2, FIG. 3). The message is sent to the Network Control System (NCS) based on the ATM signaling virtual circuit (3, FIG. 3). The Network Control System (NCS) determines if the request is valid (4, FIG. 3). If it is a valid request, it sends a request to the Multimedia server for the CPE to join/build a multicast/point-to-multipoint ATM virtual circuit for the selected channel (5, FIG. 3). The Network Control System (NCS) sends a request to the ATM switch for the CPE to join a multicast/point-to-multipoint ATM virtual circuit for the selected channel (6, FIG. 3). The Network Control System (NCS) sends a request to the Digital Subscriber Line Access Multiplexer (DSLAM) for the CPE to join a multicast/point-to-multipoint ATM virtual circuit for the selected channel (7, FIG. 3). Once this connection has been made, the multimedia information will flow to one or more CPE end-nodes (8, FIG. 3).

In order to provide support for the delivery of multimedia services in a DSL network, an economies of scale needs to be achieved for the service provider in order to cost effectively deliver these services to the end user. This economies of scale can be achieved by efficiently using network resources during the delivery of this multimedia information to the end user. In order to efficiently deliver multimedia to the end user a concept known as multicast can be employed in the network. The basic principle of multicast is the delivery of a single stream of information to many while efficiently using the resources of the network. It efficiently uses the resources of the network by having the server only send a single copy of the multimedia program and having downstream intermediate nodes replicate this program until it reaches the necessary end users. Broadcasting is ineffective at providing this, unless every end user is requesting the multimedia.

The ideal place for effective multicasting is at the edge of the network. The edge device in a Digital Subscriber Line (DSL) network is the Digital Subscriber Line Access Multiplexer (DSLAM). The DSLAM shall have the capabilities of setting up point-to-multipoint connections at the ATM layer (i.e., a multicast connection). By having this function, the DSLAM can replicate data and send it to multiple subscribers on different ports.

The uniqueness of this invention is the method by which the multicast/point-to-multipoint ATM virtual circuits are set up for the delivery of information to the end user. Also, that the system provides the control for the multicast/point-to-multipoint delivery of information to the end user.

Although the embodiment which incorporates the teachings of the present invention has been shown and described in detail herein, those skilled in the art can readily devise many other varied embodiments that still incorporate these teachings.

The invention claimed is:

1. A method for multicast delivery of information in a DSL network comprising the steps of:
   receiving requests for multicast information from multiple destination ports;
   transmitting, from a network control system, separate, respective requests to a switch and a multiplexer to join or build a multicast point to multipoint connection for a given subscriber;
   creating transmission paths between a single source port and multiple destination ports on said DSL network in response to said requests;
   receiving the multicast information at said source port;
   determining which of said destination ports is to receive said multicast information; and
   distributing said information from said source port to selective ones of said destination ports based on said step of determining.

2. A method according to claim 1, wherein said step of creating comprises creating paths between said source port and said destination ports that can be selectively multiplexed in said multiplexer, wherein said multiplexer is a digital subscriber access multiplexer (DSLAM).

3. A method according to claim 1, wherein said step of distributing comprises multiplexing said source port to said selective destination ports in said multiplexer, wherein said multiplexer is a digital subscriber line access multiplexer (DSLAM).

4. A method according to claim 1, wherein said step of receiving comprises receiving said multicast information at an ATM trunk port of said multiplexer and wherein said multiplexer is a digital subscriber line access multiplexer (DSLAM).

5. A method according to claim 1, wherein said step of determining comprises determining which destination ports are associated with users who have subscribed to receive said multicast information.

6. A method according to claim 1, wherein said step of receiving comprises receiving said multicast information at an ATM trunk port of said multiplexer and said step of distributing comprises multiplexing said source port to said selective at least one destination port in said multiplexer, wherein said multiplexer is a digital subscriber line access multiplexer (DSLAM).

7. A method according to claim 1, wherein said step of receiving comprises receiving said multicast information at an ATM trunk port of said multiplexer, said determining step comprises determining which destination ports are associated with users who have subscribed to receive said multicast information, and said step of distributing comprises multiplexing said source port to said selective destination ports in said multiplexer, wherein said multiplexer is a digital subscriber line access multiplexer (DSLAM).

8. A method according to claim 1, wherein the receiving the multicast information comprises receiving the multicast information through a multicast channel at said source port, wherein the network control system is centralized and wherein the method further comprises:
   referencing a connection profile specifying destination points of subscribers and relating the subscribers to the multicast channel within the centralized network control system, which provides address translation for the DSL network.

9. A method according to claim 8, wherein the multicast channel is a virtual circuit.

10. A DSL system for providing multicast delivery of information comprising:
    an ATM network for sending information, and configured to receive multiple requests for multicast information;
    a switch that is on the ATM network;
    a digital subscriber line access multiplexer (DSLAM) coupled to said ATM network for receiving said multicast information; and
    a network control system for controlling selective multiplexing of said multicast information through said switch and said DSLAM in response to said requests for said multicast information, wherein the network control system is also for transmitting separate, respective requests to the switch and the DSLAM to join or build a multicast point to multipoint connection for a given subscriber.

11. A DSL system according to claim 10, wherein said DSLAM comprises an ATM trunk port for receiving said multicast information from said ATM network and destination ports for receiving said multicast information selectively.

12. A DSL system according to claim 11, wherein said destination ports comprise ADSL ports.

13. A DSL system according to claim 11, wherein said network control system comprises a connection profile to determine which of said destination ports are to receive said multicast information from said ATM trunk port.

14. A DSL system according to claim 10, wherein said DSLAM comprises an ATM trunk port for receiving said multicast information from said ATM network and ADSL ports for receiving said multicast information from said ATM trunk port.

15. A DSL system according to claim 14, wherein each of said ATM trunk and ADSL ports is assigned a unique combination of virtual path and virtual channel identifiers.

16. A DSL system according to claim 10, wherein the DSLAM is for receiving said multicast information through a multicast channel, wherein the network control system is centralized, provides address translation for a DSL network and references a connection profile specifying destination points of subscribers and relating the subscribers to the multicast channel to control demultiplexing of said multicast information.

17. A DSL system according to claim 16, wherein the multicast channel is a virtual circuit.

18. A method for multicast delivery of information in a DSL network comprising the steps of:
    receiving requests for multicast information from multiple destination ports;
    transmitting, from a centralized network control system, separate, respective requests to a switch and a multiplexer to join or build a multicast point to multipoint connection for a given subscriber;

creating transmission paths between a single source port and multiple destination ports on said DSL network in response to said received requests;
receiving the multicast information through a multicast channel at said source port;
referencing a connection profile specifying destination points of subscribers and relating the subscribers to the multicast channel within the centralized network control system, which provides address translation for the DSL network;

determining which of said destination ports is to receive said multicast information based on said step of referencing; and distributing said information from said source port to selective ones of said destination ports based on said step of determining.

* * * * *